United States Patent [19]
Ishibashi et al.

[11] Patent Number: 5,241,845
[45] Date of Patent: Sep. 7, 1993

[54] NEUROCONTROL FOR WASHING MACHINES

[75] Inventors: Osamu Ishibashi, Nagoya; Hirokazu Hasegawa, Seto, both of Japan

[73] Assignee: Kabushiki Kaisha Toshiba, Kawasaki, Japan

[21] Appl. No.: 803,019

[22] Filed: Dec. 5, 1991

[30] Foreign Application Priority Data

Feb. 28, 1991 [JP] Japan ................... 3-058394

[51] Int. Cl.$^5$ ................................ D06F 33/02
[52] U.S. Cl. .................... 68/12.02; 68/12.04; 68/12.21; 68/12.16
[58] Field of Search ............ 68/12.02, 12.04, 12.21, 68/12.16

[56] References Cited

U.S. PATENT DOCUMENTS

| | | | |
|---|---|---|---|
| 5,083,447 | 1/1992 | Kiuchi et al. | 68/12.05 |
| 5,134,867 | 8/1992 | Kiuchi et al. | 68/12.04 |

FOREIGN PATENT DOCUMENTS

| | | | |
|---|---|---|---|
| 59-115085 | 7/1984 | Japan | 68/12.02 |
| 60-163689 | 8/1985 | Japan | 68/12.02 |
| 61-94688 | 5/1986 | Japan | 68/12.02 |
| 2-77296 | 3/1990 | Japan | 68/12.02 |
| 2-243191 | 9/1990 | Japan | 68/12.02 |
| 2-255185 | 10/1990 | Japan | 68/12.02 |
| 3-32699 | 2/1991 | Japan | 68/12.04 |
| 3-94796 | 4/1991 | Japan | 68/12.02 |

*Primary Examiner*—Frankie L. Stinson
*Attorney, Agent, or Firm*—Limbach & Limbach

[57] ABSTRACT

A fully automatic washing machine includes a detector for detecting a cloth volume, cloth type, soil degree and soil type in regard to clothes contained in a wash tub. A control device calculates a wash water stream in a wash step and a period of the wash step in the washing operation by a neurocontrol in which data of the cloth volume, the cloth type, soil degree and soil type are supplied to a neural network as input data. The neurocontrol is compensated for in accordance with the turbidity of a wash liquid detected at the time of completion of the wash step.

10 Claims, 16 Drawing Sheets

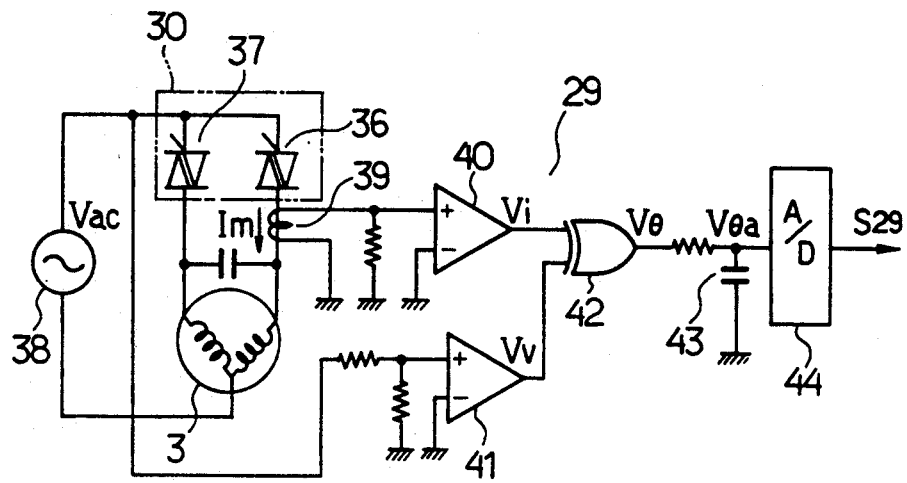
FIG.7
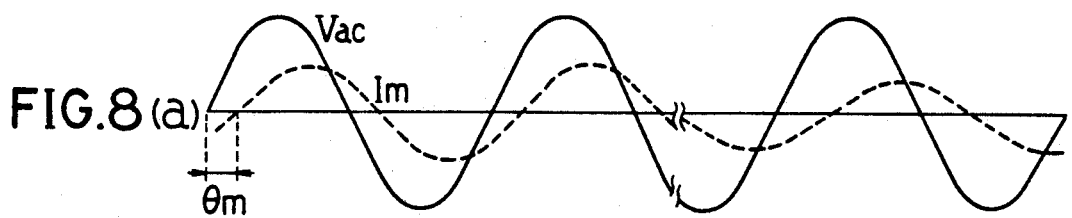
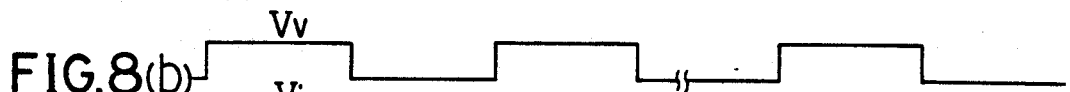

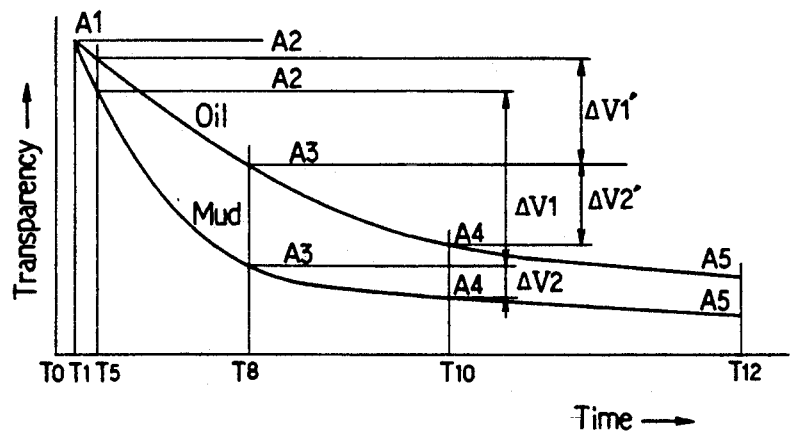
FIG.11
| Water stream mode | 1 | 2 | 3 | 4 | 5 | 6 | 7 | 8 (Standard) | 9 | 10 | 11 | 12 | 13 | 14 | 15 | 16 |
|---|---|---|---|---|---|---|---|---|---|---|---|---|---|---|---|---|
| Energization | 0.75 | 0.75 | 0.8 | 0.8 | 0.85 | 0.85 | 0.9 | 0.9 | 0.95 | 0.95 | 1.0 | 1.0 | 1.05 | 1.05 | 1.1 | 1.1 |
| Deenergization | 1.35 | 1.3 | 1.25 | 1.2 | 1.15 | 1.1 | 1.05 | 1.0 | 0.95 | 0.9 | 0.85 | 0.8 | 0.75 | 0.7 | 0.65 | 0.6 |
Weak ←→ Intense
FIG.12
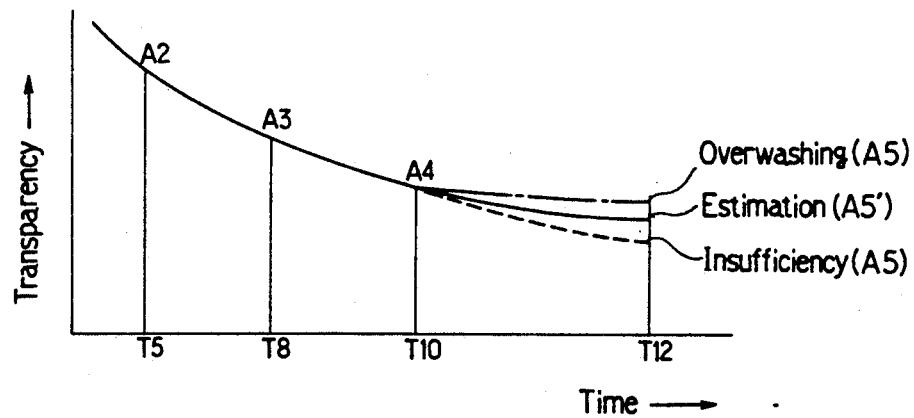
FIG.13

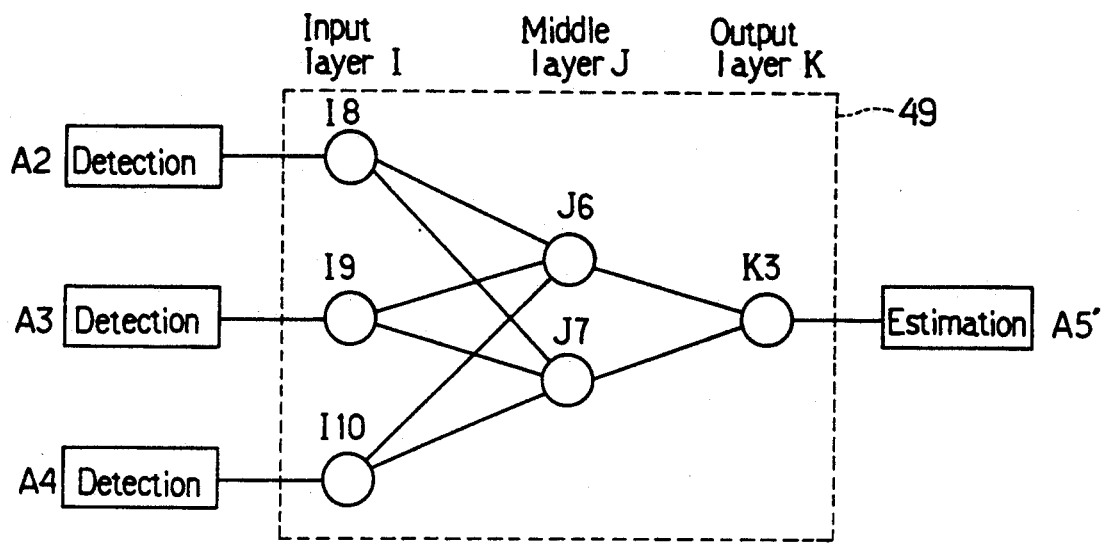
FIG.14
ROM | W0, θ0
RAM | U, V, W, θ, ΔW, Δθ, ΣΔW, Σθ
FIG.15
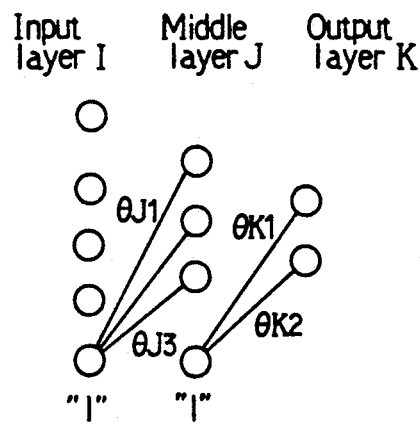
FIG.16

NEUROCONTROL FOR WASHING MACHINES

BACKGROUND OF THE INVENTION

This invention relates to a fully automatic washing machine wherein a wash step in a washing operation is executed under a neurocontrol.

In conventional fully automatic washing machines, data of a plurality of washing operation courses is previously stored in storage means. The washing operation courses include STANDARD, STUBBORN SOIL, SOAKING, SOFT WASH courses and the like. These courses differ from one another in a wash period and a water stream mode and the like in a wash step. A desired one of the courses is selected by a course selecting key and is executed.

However, for family reasons, clothes to be washed differ multifariously from one another in the state of the clothes, that is, cloth conditions including a cloth volume and a cloth type and soil conditions including a soil degree and a soil type. Such multifariousness cannot be coped with by the previously determined washing operation courses in the above-described conventional fully automatic washing machine, resulting in failing to achieve a desired washing effect.

Fully automatic washing machines incorporating a fuzzy logic control device have recently been commercially produced. In this type washing machine, the cloth volume and the cloth type as the cloth conditions of the clothes to be washed are detected so that the wash period and wash water stream mode are controlled in the wash step.

The cloth conditions such as the cloth volume and the cloth type are adopted as factors for determining the wash period and wash water stream mode in the conventional fuzzy logic controlled fully automatic washing machine. However, the soil conditions such as the soil degree and the soil type are not taken into consideration in the conventional fully automatic washing machine incorporating the fuzzy logic control. Consequently, more desirable washing effect cannot be achieved from the control employing only the cloth conditions as the factor determining the wash period and wash water stream mode.

SUMMARY OF THE INVENTION

Therefore, a first object of the present invention is to provide a fully automatic washing machine wherein most desirable washing effect can be achieved in accordance with the state of the clothes by way of the neurocontrol.

A second object of the invention is to provide a fully automatic washing machine wherein the neurocontrol can be compensated for by learning as the result of repeated daily use.

A third object of the invention is to provide a fully automatic washing machine wherein a weighting factor and a threshold value are not varied even when the neurocontrol is compensated for.

A fourth object of the invention is to provide a fully automatic washing machine wherein execution of the wash step cannot be obstructed even when the neurocontrol is undesirably compensated for.

A fifth object of the invention is to provide a fully automatic washing machine wherein the number of sensors for the neurocontrol can be reduced to the least.

A sixth object of the invention is to provide a fully automatic washing machine wherein the contents of compensation for the neurocontrol can reliably be preserved or stored even in the occurrence of electric power supply failure.

To achieve the first object, the present invention provides sensor means for sensing states of clothes to be washed or the like, the states of clothes including a cloth condition including a soil degree, and control means including a neural network to which data from the sensor means is input so that a wash period of a wash step of the washing operation is determined under a neurocontrol and the wash step is executed, the control means being provided with a function of causing the neural network to execute relearning so that contents of the wash step to be executed is compensated for in accordance with a degree of cleaning of the clothes at the time of completion of the wash step.

To achieve the second object, the invention provides a washing machine further comprising a transparency detector for detecting the transparency of a wash liquid. The control means compensates for either one or both of a weighting factor and a threshold value of the neurocontrol by means of training data which is based on the transparency detected by the transparency detector at the time of completion of the wash step, thereby compensating for the contents of the wash step to be executed.

To achieve the third object, the invention provides a washing machine further comprising a transparency detector for detecting the transparency of a wash liquid. The control means supplies the neurocontrol with compensation data based on the transparency of the wash liquid detected by the transparency detector at the time of completion of the wash step, thereby compensating for the contents of the wash step to be executed.

To achieve the fourth object, when either one or both of the weighting factor and the threshold value of the neurocontrol are compensated for, either one or both of the weighting factor and the threshold value compensated for are provided with upper and lower limit values respectively.

To achieve the fifth object, the transparency detector further serves as a detector for detecting a soil degree and a soil type in accordance with a variation pattern of the transparency of the wash liquid in the wash step. The soil degree and the soil type being included in the states of the clothes to be washed or the like.

To achieve the sixth object, the contents of the wash step compensated for by the control means are stored in either non-volatile storage means or storage means with a backup power supply.

Other objects of the present invention will become obvious upon understanding of the illustrative embodiments about to be described or will be indicated in the appended claims. Various advantages not referred to herein will occur to one skilled in the art upon employment of the invention in practice.

BRIEF SUMMARY OF THE DRAWINGS

The invention will be described by way of example with reference to the accompanying drawings in which:

FIG. 7 shows an electrical connection of a capacitive sensor employed in the washing machine;

FIGS. 8(a) to 8(d) are waveform charts for explaining the operation of the capacitive sensor;

FIG. 11 is a graph showing characteristics of transparency;

FIG. 12 shows the result of output of wash water stream mode data;

FIG. 13 is a graph similar to FIG. 11 explaining the operation of detecting the degree of cleaning;

FIG. 14 schematically illustrates a neural network for explaining the operation of detecting the degree of cleaning;

FIG. 15 illustrates contents of ROM and RAM employed in a microcomputer;

FIG. 16 is a view explaining the operation of determining the threshold value;

DESCRIPTION OF THE PREFERRED EMBODIMENTS

A first embodiment of the present invention will be described with reference to FIGS. 1 to 26 of the accompanying drawings.

Figure 2:
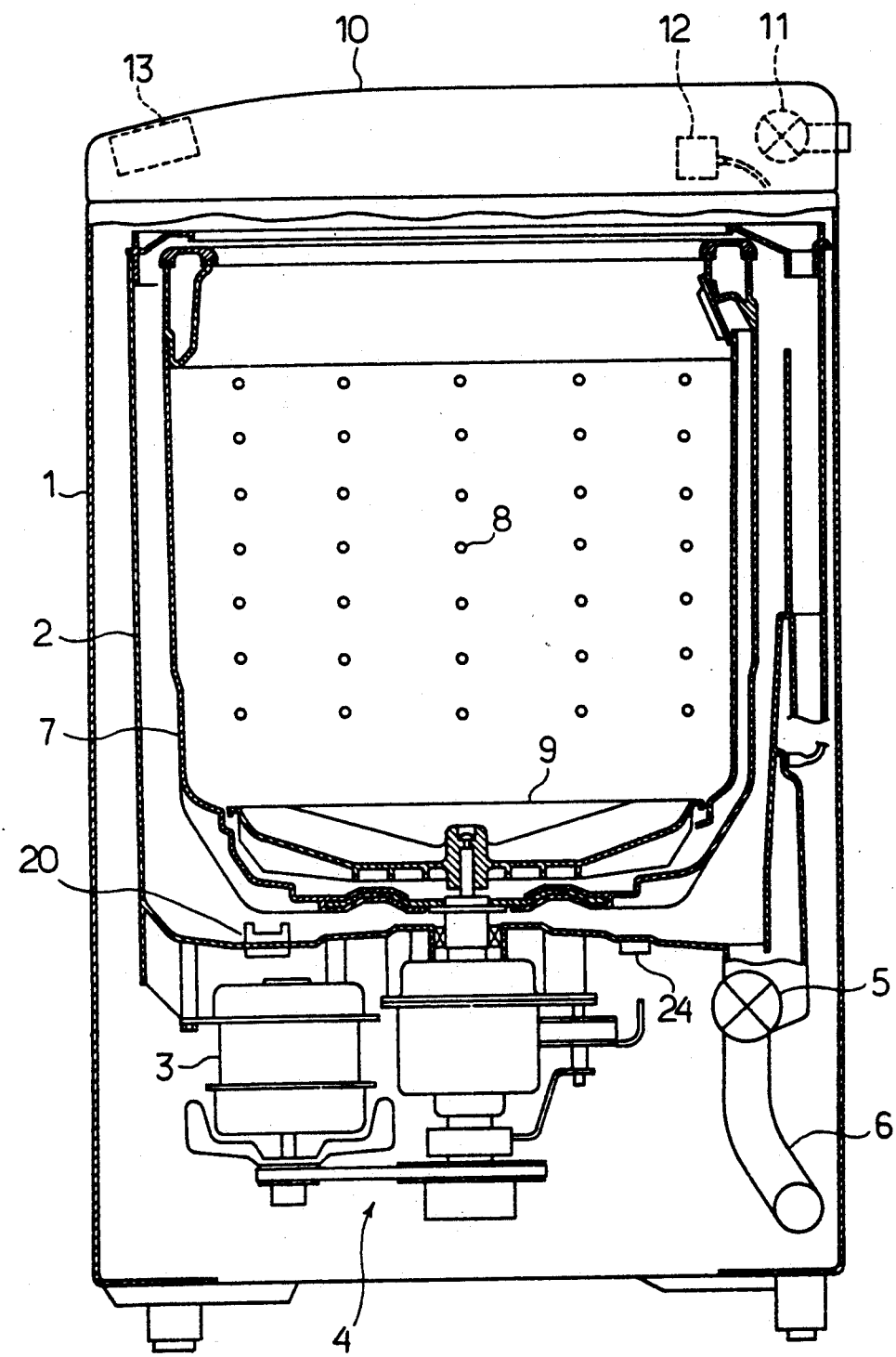
FIG. 2 is a longitudinal sectional view of the washing machine.

Referring first to FIG. 2, an overall construction of the fully automatic washing machine in accordance with the invention will be described. An outer tub 2 is provided in an outer cabinet 1 of the washing machine. A drive mechanism 4 comprising an electric motor 3, a drain valve 5 and a drain hose 6 are provided below the outer tub 2. An inner wash tub 7 is rotatably mounted in the outer tub 2. The inner tub 7 is rotated by the drive mechanism 4 in a dehydration step. A number of dehydration holes are formed in the peripheral wall of the inner tub 7. An agitator 9 is rotatably mounted in the inner tub 7. The agitator 9 is rotated by the drive mechanism 4 in wash and rinse steps.

Figure 4:
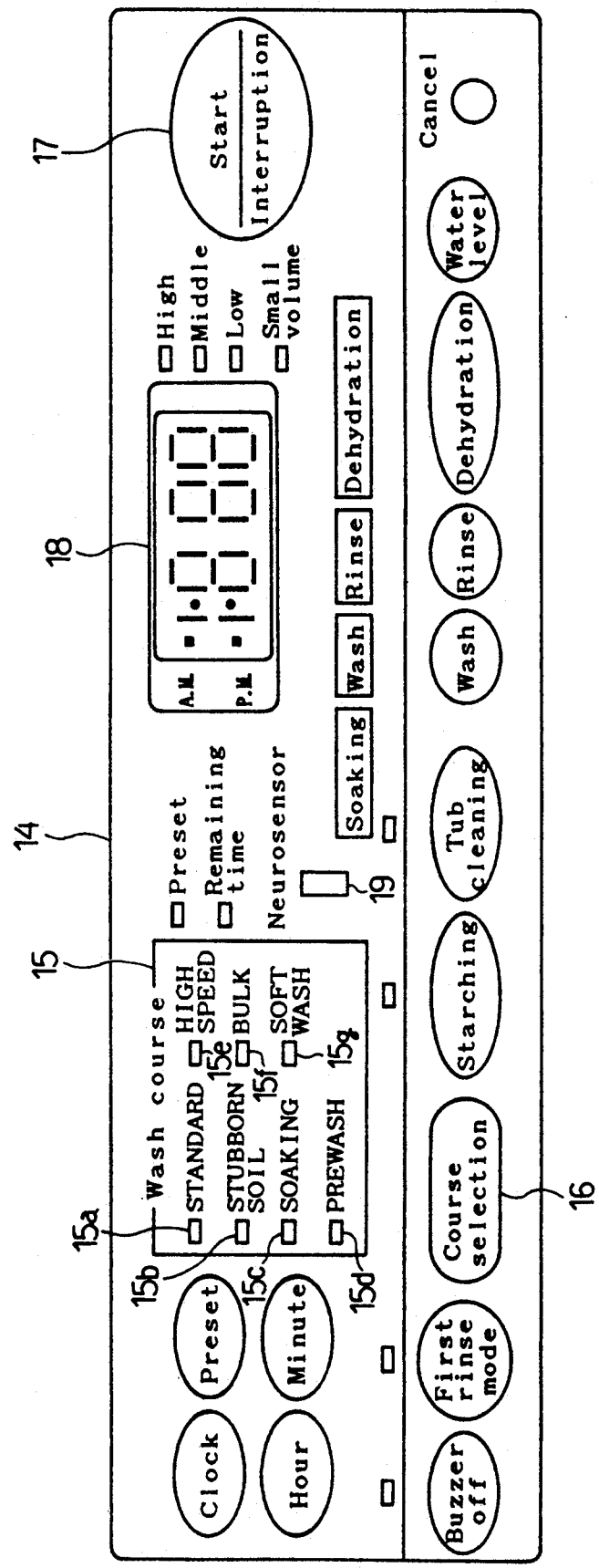
FIG. 4 is a top view of an operation panel of the washing machine.

A top cover 10 is attached to the top of the outer cabinet 1. A water supply valve 11 for supplying water to the inner tub 7 (outer tub 2) is provided in the rear interior of the top cover 10. A water level sensor 12 is also mounted in the top cover 10 rear interior for detecting the water level in the outer tub 2 (inner tub 7). A microcomputer 13 serving as control means is provided in the front interior of the top cover 10. The operation of the microcomputer 13 will be described later. An operation panel 14 as shown in FIG. 4 is mounted on the front edge of the top cover 10. The operation panel 14 includes a washing course display section 15 displaying characters indicative of courses of STANDARD, STUBBORN SOIL, SOAKING, PREWASH, HIGH SPEED, BULK and SOFT WASH. Light-emitting diodes 15a to 15g are mounted on the left-hand sides of the respective characters.

The operation panel 14 further includes a course selecting key 16, a start key 17 also serving as an interruption key, a seven-segment type display 18 and a light-emitting diode 19 continuously or intermittently turned on for indicating that a neural network 45 which will be described in detail later is activated.

Figure 5:
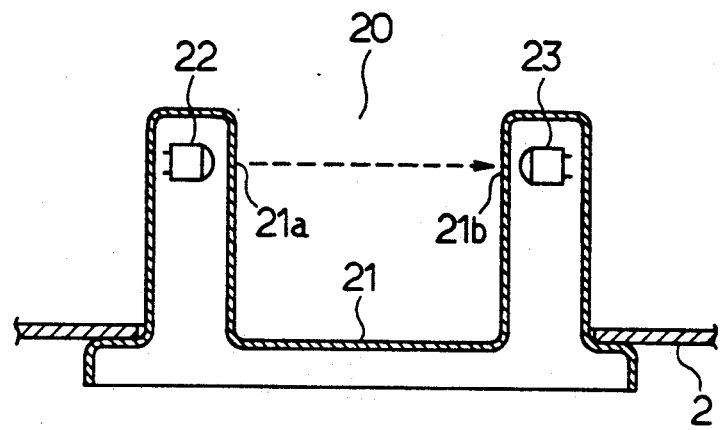
FIG. 5 is a longitudinal sectional view of a transparency detector employed in the washing machine.

A transparency detector 20 is mounted on the inner bottom of the outer tub 2. The transparency detector 20 comprises a light-emitting element 22 such as a light-emitting diode and a photoreceptive element 23 such as a phototransistor, both elements being disposed in a case 21 so as to be opposite to each other, as shown in FIG. 5. Portions 21a and 21b of the case opposite to the respective elements 22, 23 are formed from a light-transmissible material. A photoreception signal generated by the photoreceptive element 23 is digitized by an A/D converter (not shown) to be delivered from the transparency detector 20 as a transparency signal $S_{20}$.

Figure 6:
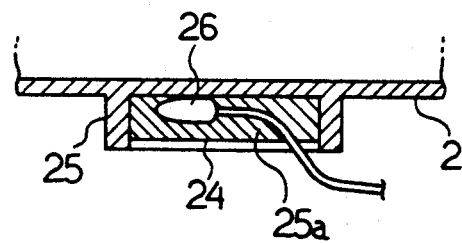
FIG. 6 is a longitudinal sectional view of a temperature sensor employed in the washing machine.

A temperature sensor 24 is mounted on the outer bottom of the outer tub 2. The temperature sensor 24 comprises a thermistor 26 disposed in an annular projection 25 formed on the outer bottom of the outer tub 2, as shown in FIG. 6. A resin 25a is inserted in the annular projection 25 so that the thermistor 26 is embedded in it. A temperature signal generated by the thermistor 26 is digitized to be delivered as a water temperature signal $S_{24}$.

Figure 3:
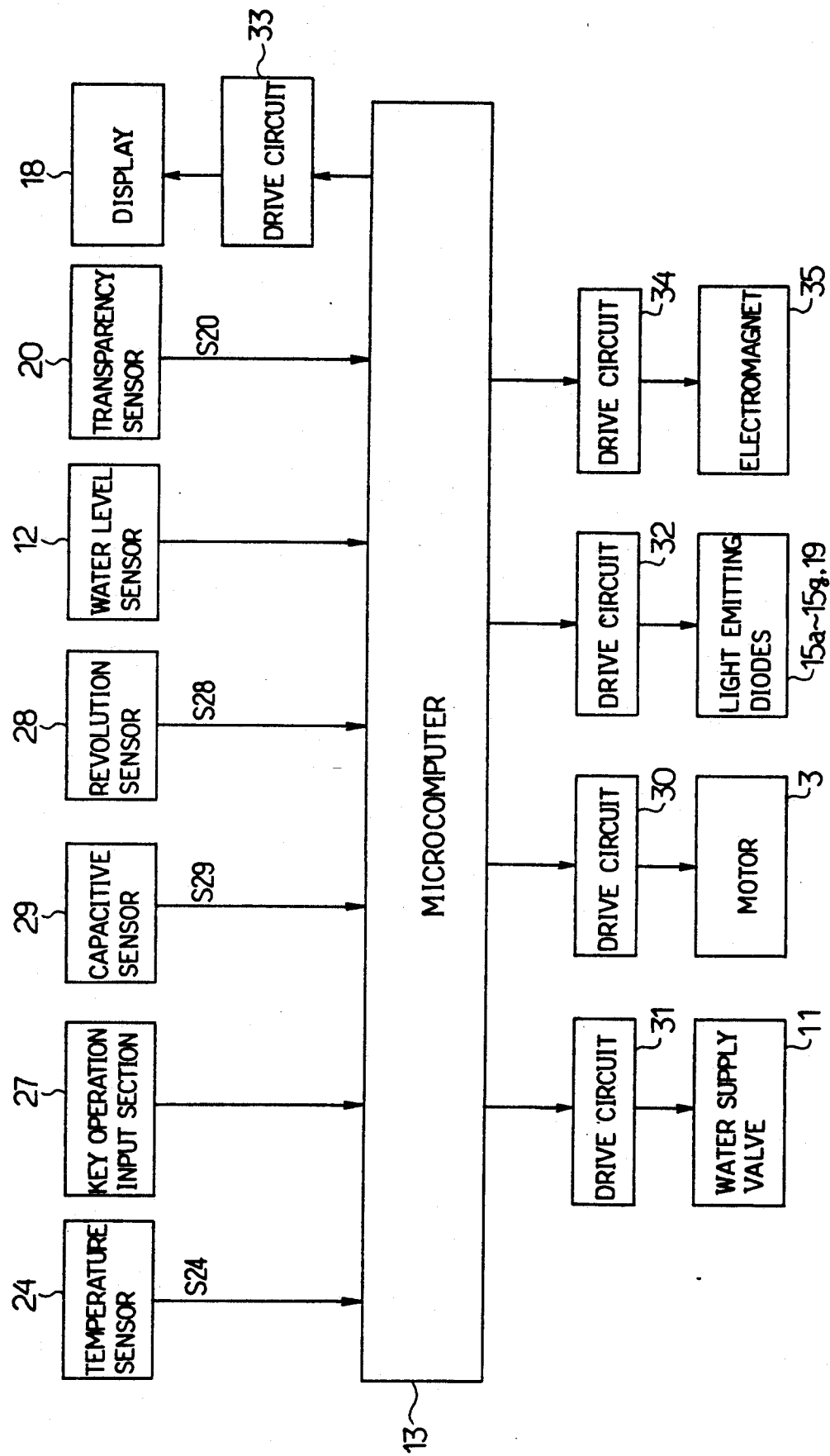
FIG. 3 is a block diagram showing an electrical arrangement of the washing machine.

Referring to FIG. 3, an electrical arrangement of the washing machine will be described. Signals based on operation of various keys on the operation panel 14 are delivered from a key operation input section 27. An output terminal of the key operation input section 27 is connected to one input port of the microcomputer 13. Output terminals of the water level sensor 12, the transparency detector 20 and the temperature sensor 24 are connected to respective other input ports of the microcomputer 13. An output terminal of a revolution detector 28 for detecting the number of revolution of the motor 3 is connected to further another input port of the microcomputer 13. An output terminal of a capacitive sensor 29 is connected to further another input port of the microcomputer 13.

Two of output ports of the microcomputer 13 are connected to the motor 3 and the water supply valve 11 through drive circuits 30 and 31, respectively. Another output port of the microcomputer 13 is connected to the light-emitting diodes 15a–15g and 19 through a drive circuit 32. Further another output port of the microcomputer 13 is connected to the display 18 through a drive circuit 33. Further another output port of the microcomputer 13 is connected to an electromagnet 35 through a drive circuit 34. The electromagnet 35 is provided both for a clutch (not shown) of the drive mechanism 4 and for the drain valve 5.

Upon depression of the course selecting key 16 shown in FIG. 4, the microcomputer 13 operates to supply signals to the light-emitting diodes 15a-15g through the drive circuit 32. The light-emitting diodes 15a-15g are sequentially flushed every time the course selecting key 16 is depressed or while it is being depressed. Upon release of depression of the course selecting key 16, the sequential flushing among the light-emitting diodes 15a-15g is stopped. The microcomputer 13 determines that the washing course corresponding to the light-emitting diode being activated at the time of stop of the sequential flushing among the light-emitting diodes has been selected.

An electrical arrangement of the capacitive sensor 29 will now be described with reference to FIG. 7. The drive circuit 30 for the motor 3 comprises two bidirectional triode-thyristers (triacs) 36 and 37. The power supply voltage $V_{ac}$ of an ac power supply 38 is applied to the motor 3 through the thyristers 36, 37. A current $I_m$ flowing into the motor 3 is detected by a current transformer 39. The voltage whose value corresponds to the detection current of the current transformer 39 is supplied to an non-inverting input terminal (+) of a comparator 40. An inverting input terminal (−) of the comparator 40 is at the ground potential. Furthermore, the power supply voltage $V_{ac}$ is divided and then, supplied to an non-inverting input terminal (+) of another comparator 41. An inverting input terminal (−) of the comparator 41 is at the ground potential. Output signals from the comparators 40, 41 are supplied to an input terminal of an exclusive OR (XOR) circuit 42. An output signal from the XOR circuit 42 is supplied to an integrating circuit 43. An output signal from the integrating circuit 43 is supplied to an input terminal of an analog-to-digital (A/D) conversion circuit 44.

A phase difference $\theta_m$ of the current $I_m$ flowing into the motor 3 with respect to the power supply voltage $V_{ac}$ is reduced as the increase of power of the motor 3, and the power of the motor 3 is proportional to a volume of clothes to be washed (a cloth volume). Accordingly, the cloth volume can be detected by detecting the phase difference $\theta_m$. More specifically, the comparators 40, 41 deliver pulses $V_i$ and $V_v$ in accordance with the current $I_m$ and power supply voltage $V_{ac}$, respectively, as shown in FIG. 8. The XOR circuit 42 delivers a phase difference pulse $V_\theta$ in accordance with the pulses $V_i$, $V_v$. Consequently, when an average voltage $V_{\theta a}$ of the phase difference pulse $V_\theta$ is detected by the integrating circuit 43, a digitized cloth volume signal S29 is delivered from the A/D conversion circuit 44.

Figure 1:
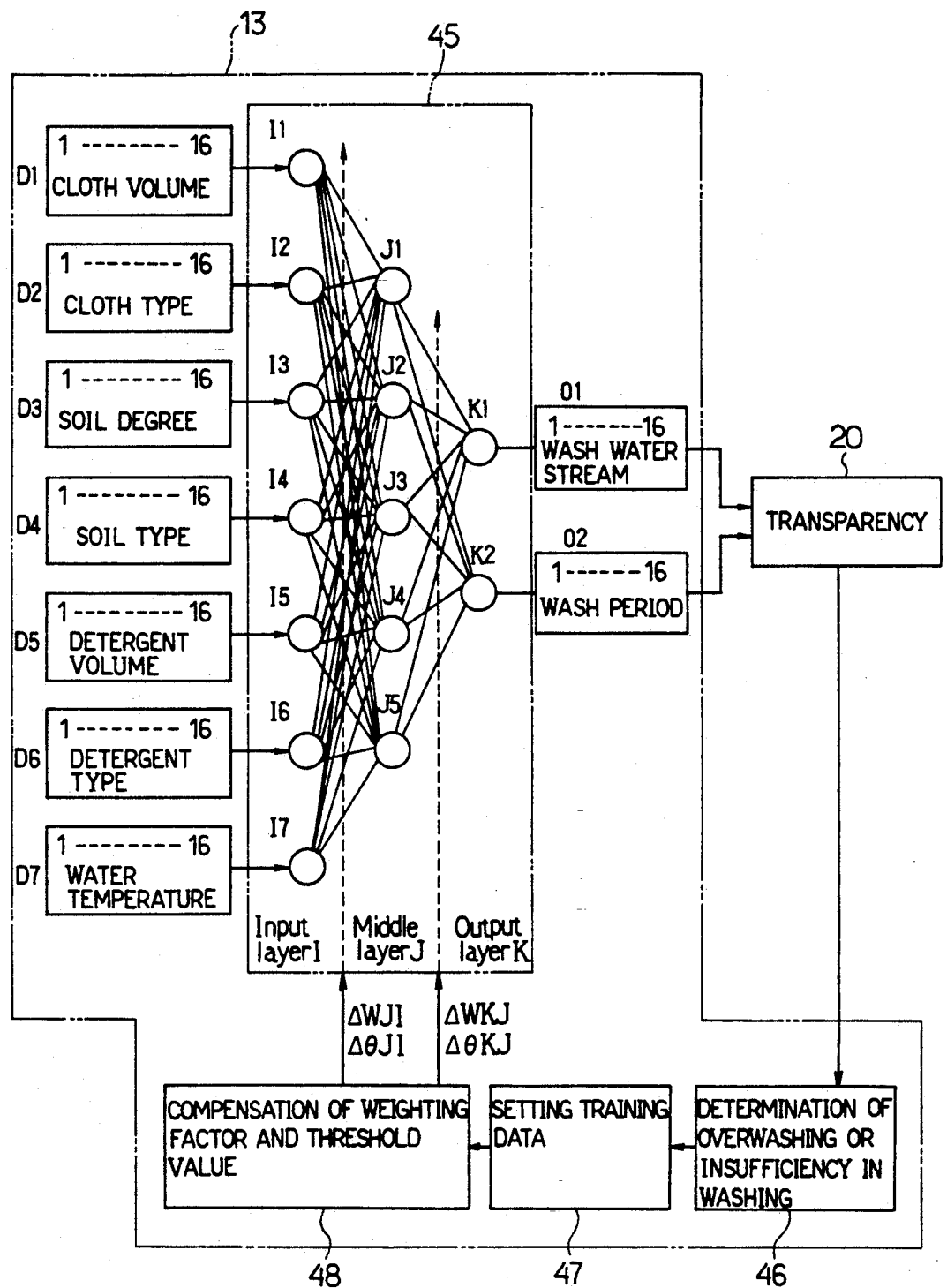
FIG. 1 schematically illustrates a neurocontrol employed in a washing machine of one embodiment of the invention.

The microcomputer 13 is provided with a neural network 45 for neurocontrol as shown in FIG. 1. Although the neural network 45 is actually composed in software, it is shown in the embodiment as composed in hardware for the purpose of description.

The neural network 45 comprises an input layer I including seven units $I_1$ to $I_7$, a middle or hidden layer J including five units $J_1$ to $J_5$, and an output layer K including two units $K_1$ and $K_2$. Each of the units $I_1$-$I_7$ and the units $J_1$-$J_5$ are connected to each other by links. Each of the units $J_1$-$J_5$ and each of the units $K_1$, $K_2$ are connected to each other by links or connections.

The microcomputer 13 is further provided with a determination circuit determining whether or not the transparency signal S20 has been supplied thereto from the transparency detector 20, a setting circuit 47 setting training data from the result of determination by the determination circuit 46, and a compensation circuit 48 compensating for a weight factor and a threshold value of each link of the neural network based on the training data supplied thereto from the setting circuit 47. Although these circuits 46-48 are actually composed in software, they are shown in the embodiment as composed in hardware.

The operation of the washing machine will be described with reference to FIGS. 9-26.

Figure 9:
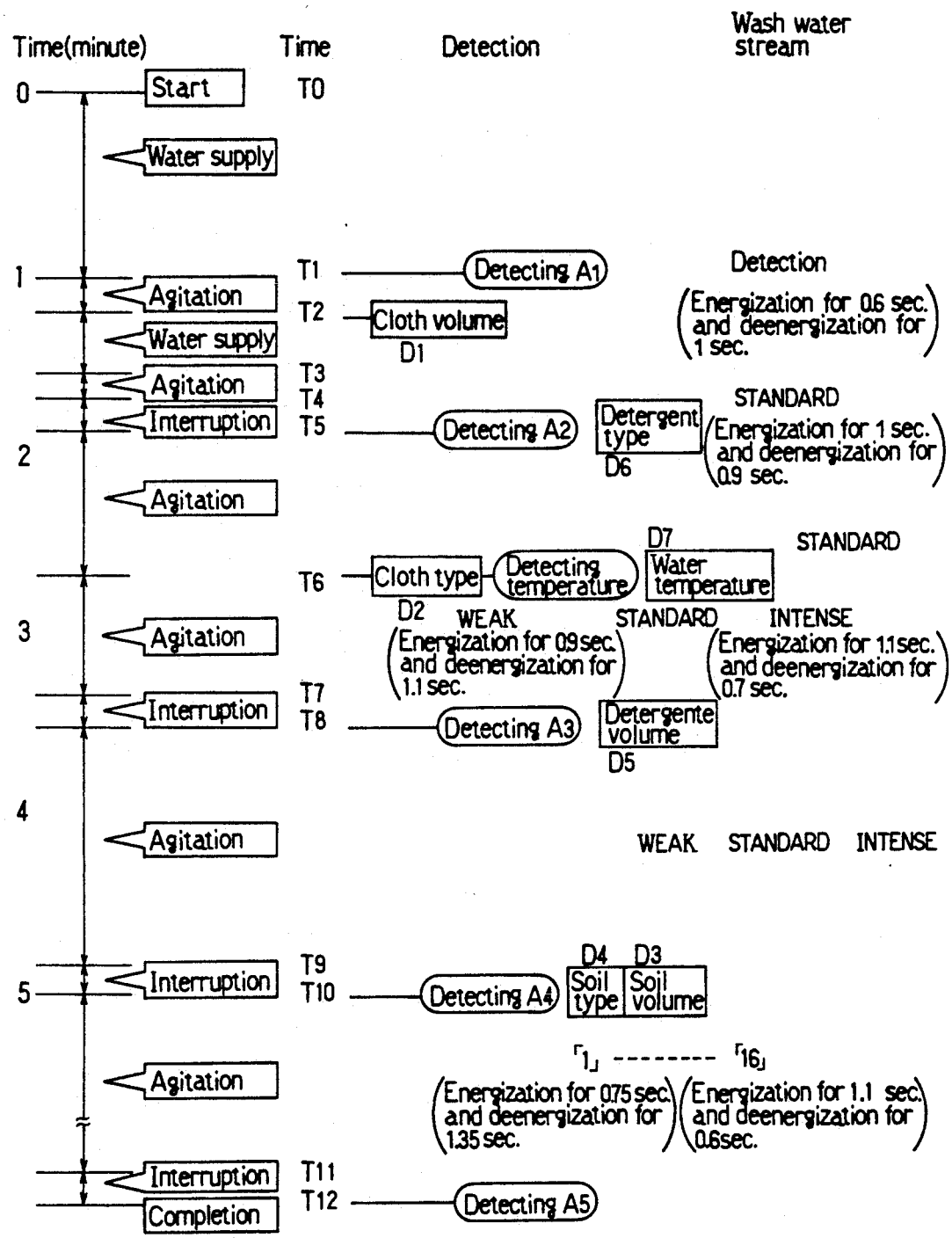
FIG. 9 is a time chart for explaining the operation of the capacitive sensor in the wash step.
Figure 10:
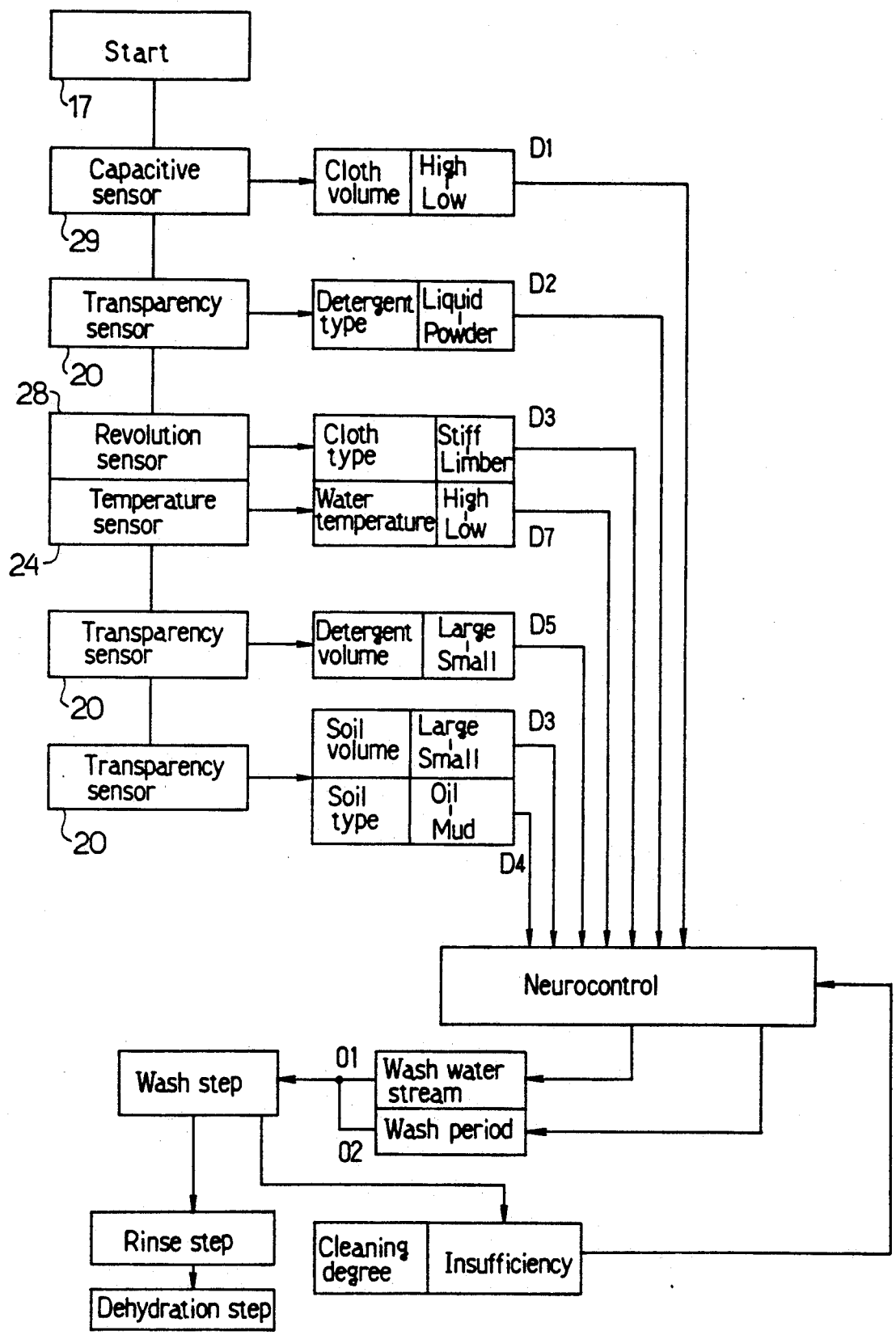
FIG. 10 is a view showing sequences of input and output data and the wash step.

First, clothes to be washed are put into the inner tub 7 with a suitable amount of detergent. Then, the course selecting key 16 is depressed and thereafter, the depression is released such that one of the light-emitting diodes 15d-15g, for example the light-emitting diode 15a, is activated, thereby selecting the STANDARD course as the washing course. Referring to FIG. 9, when the start key 17 is depressed at time $T_0$, the microcomputer 13 operates to continuously turn on the light-emitting diode 19 indicative of activation of the neural network. Furthermore, when the start key 17 is depressed, the wash step is initially set. The microcomputer 13 operates to energize the water supply valve 11 via the drive circuit 31 so that water is supplied to the inner tube (or outer tub 2). Four water levels, HIGH, MIDDLE, LOW and SMALL VOLUME are provided. Subsequently, when the water level in the inner tube 7 reaches SMALL VOLUME, the microcomputer 13 operates to deenergize the water supply valve 11 at time $T_1$ based on a signal from the water level sensor 12. In this case the microcomputer 13 operates to input the transparency signal S20 from the transparency detector 20, and the input data is stored as detection data in a random access memory (RAM).

Furthermore, the microcomputer 13 operates to energize the motor 13 via the drive circuit 30. In this case the motor 3 is energized for 0.6 sec. for forward rotation, deenergized for one sec. and energized again for 0.6 sec. for reverse rotation, repeatedly. As the result of energization of the motor 3, the agitator 9 is driven such that a detection water stream is produced. The production of the detection water stream is continued for 15 to 20 sec. The microcomputer 13 operates to input the cloth volume signal S29 from the capacitive sensor 29 during the production of the detection water stream and the input signal S29 is stored as the cloth volume data $D_1$ in RAM. The microcomputer 13 then operates to determine the volume of cloth based on the stored cloth volume data $D_1$. Subsequently, the microcomputer 13 operates to deenergize the motor 3 and to re-energize the water supply valve 11 at time $T_2$.

The microcomputer 13 is provided with three levels of LOW, MIDDLE and HIGH for determination of the cloth volume. The microcomputer 13 operates to set the water level to LOW, MIDDLE or HIGH in accordance with the level of the cloth volume. Subsequently, the microcomputer 13 operates to deenergize the water supply valve 11 and to energize the motor 3 at time $T_3$ when the set water level, LOW, MIDDLE or HIGH is reached in the inner tub 7. In this case the motor 3 is energized for one sec. for forward rotation, deenergized for 0.9 sec., energized for one sec. for reverse rotation and deenergized for 0.9 sec., repeatedly. As the result of drive of the agitator 9, a standard water stream is produced. The microcomputer 13 operates to deenergize the motor 3 at time $T_4$ when the production of the standard water stream is performed for a predetermined period of time. A period of deenergization of the motor 3 initiated at time $T_4$ is set to a relatively short period of time such as for 15 sec. In the period of deenergization of the motor 3 (period between $T_4$ and $T_5$), the microcomputer 13 operates so that the light-emitting diode 19 is changed from a continuous lighting mode to a flashing mode, whereby a user can be prevented from mistaking the motor deenergization as due to failure.

When the motor 3 is deenergized to stop the agitator 9, the movement of the wash liquid is ceased, which causes air bubbles contained in the wash liquid and the like to float up to the water surface. Furthermore, the vibrations of the outer tub 2 due to the flow of wash liquid ceases. Consequently, the transparency of the wash liquid becomes stable. The microcomputer 13 then inputs the transparency signal $S_{20}$ from the transparency detector 20 to store in RAM as the detection data $A_2$. The microcomputer 13 operates to compare the present detection data $A_2$ with the last detection data $A_1$, as shown in FIG. 11. The microcomputer 13 determines that the supplied detergent is a liquid detergent when the difference between the data $A_1$ and $A_2$ is small. When the difference is large, the microcomputer 13 determines that the supplied detergent is a powdered detergent. The results of the determination are stored as detergent type data $D_6$ in RAM. The determination of the detergent type relies upon the fact that the liquid detergent does not make the wash liquid turbid so much though the powdered detergent makes the wash liquid more and more turbid as it dissolves in the wash liquid.

Subsequently, the motor 3 is energized to drive the agitator 9 in the standard water stream mode at time $T_5$. When the agitator 9 is rotated forward and in reverse, the number of revolution of the motor 3 is varied in accordance with the kind of clothes, that is, the cloth type at every time of starting of the agitator 9. The microcomputer 13 operates to detect an amount of variation of the motor 3 revolution from revolution signals $S_{28}$ generated by a revolution sensor 28. The microcomputer 13 determines the cloth type of the clothes to be washed from the amount of variation of the motor revolution. For example, the microcomputer 13 may be provided with three levels, STIFF, STANDARD and LIMBER, for determination of the cloth type. The determined level of the cloth type is stored as cloth type data $D_2$ in RAM at time $T_6$. Furthermore, the microcomputer 13 inputs the temperature signal $S_{24}$ from the temperature sensor 24 at that time and the wash liquid temperature is stored as liquid temperature data $D_7$ in RAM based on the input temperature signal.

When the cloth type is determined, the microcomputer 13 operates to set the wash water stream mode to INTENSE, STANDARD or WEAK in accordance with the determination result, STIFF, STANDARD or LIMBER respectively. When the water stream mode is determined to be WEAK, the motor 3 is energized for forward rotation for 0.9 sec., deenergized for 1.1 sec., energized for reverse rotation for 0.9 sec. and deenergized for 1.1 sec. in turn repeatedly. When the water stream mode is determined to be STANDARD, the motor 3 is controlled as described above in conjunction with the determination of the cloth volume. When the water stream mode is determined to be INTENSE, the motor 3 is energized for forward rotation for 1.1 sec., deenergized for 0.7 sec., energized for reverse rotation for 1.1 sec. and deenergized for 0.7 sec. in turn repeatedly. Thus, the water stream mode is promptly selected so as to correspond to the cloth type in order that the cloth can be prevented from being damaged during washing.

The motor 3 is deenergized at time $T_7$ when an agitation of the wash liquid and the clothes is performed in any one of the water stream modes, WEAK, STANDARD and INTENSE, for a predetermined period of time. In this case, too, the light-emitting diode 19 is flashed. In the condition that the motor 3 is deenergized, the microcomputer 13 inputs the transparency signal $S_{20}$ from the transparency detector and the input transparency signal is stored as the detection data $A_3$ in RAM. The microcomputer 13 then compares the data $A_3$ with the previous data $A_2$. It is determined that an amount of detergent is small when the difference between the data $A_2$ and $A_3$ is small. When the difference is large, it is determined that the detergent amount is large. The results of the determination are stored as the detergent amount data $D_5$ in RAM.

Subsequently, rotation of the motor 3 is initiated at time $T_8$ such that the agitation 9 is driven in the wash water stream mode set as described above. After lapse of a predetermined period of time, the motor 3 is deenergized again at time $T_9$. In this case, too, the light-emitting diode 19 is flashed. The microcomputer 13 inputs the transparency signal $S_{20}$ from the transparency detector 20 and the input transparency signal is stored as the detection data $A_4$ in RAM at time $T_{10}$.

The microcomputer 13 then computes $A_3 - A_2 \Delta V_1$, $\Delta V_1'$, $A_4 - A_3 = \Delta V_2$, and $\Delta V_2'$ from the detection data $A_2$, $A_3$ and $A_4$ at respective times $T_5$, $T_8$ and $T_{10}$, as shown in FIG. 11. Since the difference between $\Delta V_1$ and $\Delta V_2$ is large, the microcomputer 13 determines that the soil type of the clothes belongs to the group of mud. When the difference between $\Delta V_1'$ and $\Delta V_2'$ is small, it is determined that the soil type belongs to the group of oil. More specifically, since the soil whose soil type belongs to the group of mud can be removed promptly, the rate of change in the section between the detection data $A_2$ and $A_3$ is larger than that in the subsequent section between the detection data $A_3$ and $A_4$. On the other hand, since the soil whose soil type belongs to the group of oil is removed gradually, there is little difference between the rate of change in the section between the data $A_2$ and $A_3$ and that in the section between the data $A_3$ and $A_4$. The soil type data $D_4$ thus computed by the microcomputer 13 is stored in RAM. The microcomputer 13 also computes soil degree data $D_3$ from the absolute values of detection data $A_2$, $A_3$ and $A_4$ and the obtained soil degree data $D_3$ is stored in RAM. The computation of the soil degree data relies upon the fact that the transparency is reduced as the increase in the soil degree.

As described above, in RAM of the microcomputer 13 are stored the cloth volume data $D_1$ and the cloth type data $D_2$ each as the cloth condition, the soil degree data $D_3$ and the soil type data $D_4$ each as the soil condition, the detergent volume data $D_5$ and the detergent type data $D_6$ each as the detergent condition, and the wash liquid temperature data $D_7$. These data $D_1$–$D_7$ are input to the respective units $I_1$ to $I_7$ of the input layer I of the neural network 45 so that the neurocontrol is performed.

Figure 17:
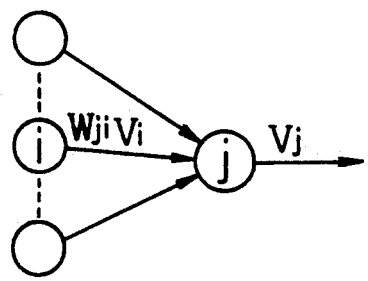
FIG. 17 is a basic diagram of the neural network for explaining the principle of the neurocontrol.
Figure 18:
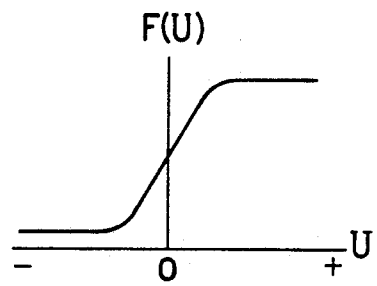
FIG. 18 is a graph of a sigmoid function for explaining the principle of the neurocontrol.

Referring now to FIGS. 17 to 20, the principle of the neural network will be outlined. The neural network simulates a human nerve net and is a network comprising units and links or connections as shown in FIG. 17. A unit j has an input and output characteristic $F_j(U_j)$ as shown in FIG. 18. The reference $F_j$ designates a sigmoid function expressed as follows:

$$F_j(U_j) = \frac{1}{1 + \exp(U_j + \theta_j)}. \tag{1}$$

An output $V_j$ of the unit j is shown by the following equation:

$$V_j = F_j\left(\sum_{i=j} W_{ji}V_i + \theta_j\right) \tag{2}$$

where
  $\Delta V_i$ is an output of another unit i,
  $W_{ji}$ is a weight factor indicative of the degree of influence of the unit i output upon the unit j, and
  $\theta_j$ is a threshold value.

Figure 19:
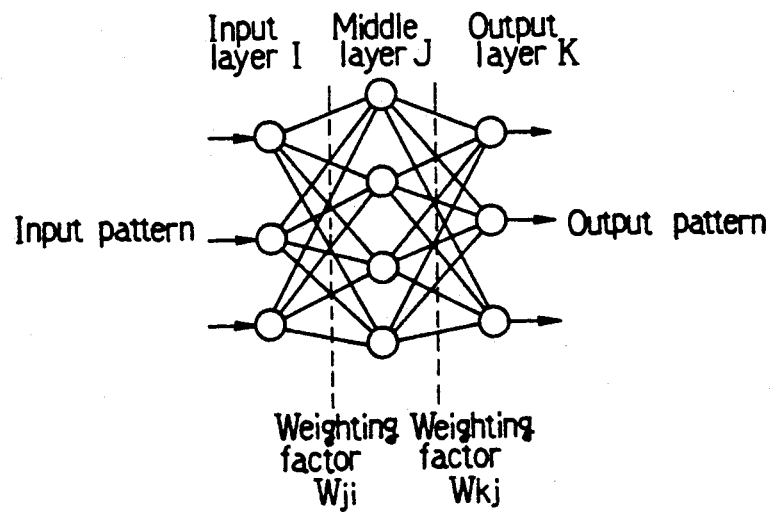
FIG. 19 is a diagram of a three-layer neural network for explaining the principle of the neurocontrol.

The neural network is classified into an interconnection type, a layered type and an intermediate type depending upon a manner of connection of the links. An example of the layered neural network is shown in the embodiment. FIG. 19 illustrates a three-layer neural network in which the units are disposed to form an input layer, a middle or hidden layer and an output layer. Three groups of units are distinguished from one another by indexes i, j and k in the drawings. The signal is transmitted from the input unit through the middle unit to the output unit only in one way in the above-described neural network. The weight factor $W_{kj}$ is set for the links between the input units and the intermediate units and the weight factor $W_{ji}$ is set for the links between the intermediate units and the output units. The neural network is composed of a large number of units as simple processing elements. Each unit produces a large output when the sum total of inputs from the other units exceeds a threshold value.

The neural network is characterized by its learning ability, high speed processing and noise proof. The learning of the neural network is performed by adjusting the weight factor of the link so that a suitable output pattern (training pattern) is obtained in regard to an input pattern (example). In this case the weight factor is initially set to a random value. After learning, a plurality of pairs of learned input and output patterns are related to one another and suitable output patters can be obtained by analogy for the input patterns other than those learned in the neural network. One of learning methods of the neural network is a back propagation method. In the back propagation method, the weight factor is adjusted by an error function between a suitable output pattern (training pattern) and an actual output pattern. The error function E is defined in the neural network in FIG. 19 as follows:

$$E = \tfrac{1}{2} \sum_k (T_k - V_k)^2 \tag{3}$$

where $T_k$ and $V_k$ are training data (desired output data) and actual output data of the unit k of the output layer respectively. The output data $V_k$ is shown by the following equation:

$$V_k = F_k(U_k), \tag{4}$$

$$U_k = \sum_j W_{kj}V_j + \theta_k. \tag{5}$$

In the back propagation method, a volume of modification of the weight factor is calculated and the modification is repeated until the value of the weight factor is below a preselected value More specifically, the amounts $W_{kj}$ and $W_{ji}$ of modification of the weight factor are obtained by the following equations:

$$\Delta W_{kj} = \eta \delta_k V_j, \tag{6}$$

$$\Delta W_{ji} = \eta \delta_j V_i \tag{7}$$

where $\delta_k = (T_k - V_k)F_k'(U_k),$ \tag{8}

$$\delta_j = F_j'(U_j) \sum_k \delta_k W_{kj}, \text{ and} \tag{9}$$

$\eta$ is a constant determined in consideration of the speed of modification of the weight factor and stability of the calculated from the amounts of modification $\Delta W_{kj}'$ and $\Delta W_{ji}'$ as follows:

$$W_{kj}' = W_{kj} + \Delta W_{kj}, \tag{10}$$

$$W_{ji}' = W_{ji} + \Delta W_{ji}. \tag{11}$$

Learning is transferred to a subsequent training pattern after the calculation of the new weight factors $W_{kj}$ and $W_{ji}$.

Figure 20:
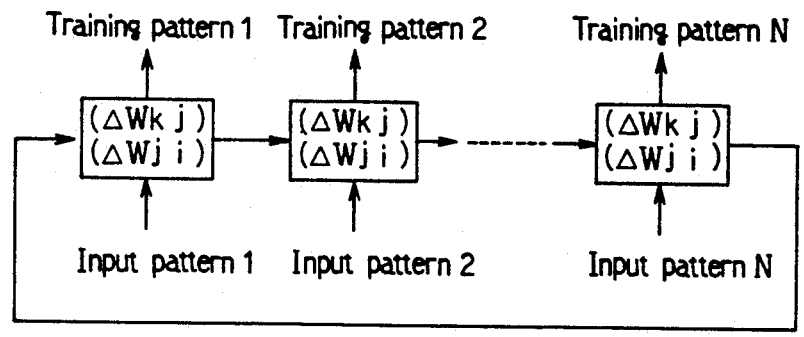
FIG. 20 shows a sequence of the learning for explaining the principle of the neurocontrol.

FIG. 20 illustrates a procedure of learning. When N number of pairs of the input patterns and the teacher patterns are learned, the amounts of modification $\Delta W_{kj}$ and $\Delta W_{ji}$ are first calculated in the input pattern 1 and then, the weight factors are modified based on the calculated amounts of modification $\Delta W_{kj}$, $\Delta W_{ji}$. Then, the amounts of modification $\Delta W_{kj}$ and $\Delta W_{ji}$ are calculated in the input pattern 2 and the weight factors are modified based on the calculated amounts of modification $\Delta W_{kj}$, $\Delta W_{ji}$. Similarly, the weight factors are thus modified from the input pattern 3 to the input pattern N. When the amounts of modification $\Delta W_{kj}$, $\Delta W_{ji}$ are not below the predetermined value, the modification is repeated from the input pattern 1 to the input pattern N. Learning is completed when the amount of modification are below the predetermined value.

The neural network as described above can be arranged in hardware by employing a neurochip called "neuroprocessor" and the like or in the software configuration by employing a microcomputer.

The description advances to the operation of the neural network 45 of the embodiment arranged based on the above described principle. As shown in FIG. 1, 4-bit signals of the cloth volume data $D_1$, cloth type data $D_2$, soil degree data $D_3$, soil type data $D_4$, detergent volume data $D_5$, detergent type data $D_6$, and water temperature data $D_7$ are input to the respective units $I_1$ to $I_7$ of the input layer I of the neural network 45. Each input data is assigned one of the values 1 to 16. The wash water stream data $O_1$ and the wash period data $O_2$ as the output data are delivered in the form of 4-bit signals from the respective units $K_1$ and $K_2$ of the output layer of the neural network 45. In this case the wash water stream data $O_1$ is assigned one of the values "1" (energization for 0.75 sec. and deenergization for 1.35 sec.) to "16" (energization for 1.1 sec. and deenergization for 0.6 sec.), as shown in FIG. 12. The wash period data $O_2$ is assigned one of the values from "1" (7.5 min.) to "16" (15 min.), each value indicating the period increased from the last period by 0.5 min.

The calculation performed by the neural network 45 will now be described. When the input data $D_1$ to $D_7$ each as the input pattern takes the respective values $U_{I1}$ to $U_{I7}$, the units $I_1$ to $I_7$ of the input layer I deliver the respective data as the respective outputs $V_{I1}$ to $V_{I7}$ without modification. Accordingly, the outputs $V_{I1}$ to $V_{I7}$ are equal to the respective values $U_{I1}$ to $U_{I7}$.

In the case of the intermediate layer J, the input $U_{j1}$ of the unit $J_1$, for example, is shown by the following equation:

$$U_{j1} = \qquad (12)$$

$$\sum_i W_{j1Ii} V_{Ii} + \theta_{j1} = W_{j1I1} V_{I1} + W_{j1I2} V_{I2} + \ldots + W_{j1I7} V_{I7} + \theta_{j1}$$

where $W_{j1O1}$ is a weight factor of the unit $I_1$ against the unit $J_1$, $W_{j1I2}$ is a weight factor of the unit $I_2$ against the unit $J_1$, $W_{j1I7}$ is a weight factor of the unit $I_7$ against the unit $J_1$, and $\theta_{ji}$ is a threshold value.

In unit $J_1$, the sigmoid function F is calculated based on input $U_{j1}$ and the result of calculation is rendered output $V_{j1}$ as follows:

$$V_{J1} = F(U_{ji}). \qquad (13)$$

The foregoing holds in the units $J_2$ to $J_5$.

In the case of the output layer K, the input $U_{k1}$ of the unit $K_1$, for example, is shown as follows:

$$U_{K1} = \sum_i W_{K1Ji} V_{Ji} + \theta_{K1} = W_{K1J1} V_{J1} + \ldots + W_{K1J5} V_{J5} + \theta_{K1} \qquad (14)$$

where $W_{K1J1}$ is a weight factor of the unit $J_1$ against the unit $K_1$, $W_{K1J2}$ is a weight factor of the unit $J_2$ against the unit $K_1$, $W_{K1J5}$ is a weight factor of the unit $J_5$ against the unit $K_1$, and $\theta_{K1}$ is a threshold value.

In the unit $K_1$, the sigmoid function F is calculated based on input $U_{K1}$ and the result of calculation is rendered output $V_{K1}$ as follows:

$$V_{K1} = F(U_{K1}) \qquad (15)$$

The foregoing holds in the unit $K_2$.

The weight factors W and the threshold values $\theta$ are represented by 4-bit signals and may take the positive and negative values and zero. For example, "0", "1" and "−1" are represented as "0000", "0001" and "1111" respectively. The upper most bit is a negative sign bit and the result (WV) of multiplication of the weight factor W and the output V is represented by the five upper bits including the upper most bit as the negative sign bit. Furthermore, the input U is represented by 8-bit signals and the upper most bit is a negative sign bit.

The output V is represented by 4-bit signals and takes the positive value or zero.

The threshold value $\theta$ will be described with reference to FIG. 16. The units are set in the input and intermediate layers I, J so as to usually have the output of "1," respectively. When the weight factors of the links from these units are represented by $\theta K$ and $\theta J$, they can be treated as in the actual weight factors $W_{KJ}$, $W_{JI}$. The output "1" represents the maximum output value of the unit, that is, the maximum output value of the sigmoid function F. In the above-described embodiment, "16" is the maximum output value of the sigmoid function F. The threshold value may be positive, negative or zero as in the weight factor W, and the number of bits may differ. In the above-described case each one unit of the input and intermediate layers I, J may be set so as to take the output "1." Alternatively, new units may be provided for the threshold value $\theta$.

Learning of the neural network 45 is performed mainly at the stage of development of the products. Not all the input patterns need be learned. For example, the learning of about 20 input patterns suffices and that is, N in FIG. 20 takes "20." When the weighting factor W and the threshold value $\theta$ are determined as the result of learning, these values are set to the same types of washing machines for mass production.

The wash water stream data $O_1$ and the wash period data $O_2$ both as the output data are thus calculated by the neural network 45. Based on the result of calculation, the microcomputer 13 operates to select one of the values of the wash stream data $O_1$ assigned "1" to "16" and one of the values of the wash period data $O_2$ assigned "1" to "16." The microcomputer 13 then operates to execute an agitation or the wash step initiated at time $T_{10}$.

Subsequently, when the selected wash period elapses at time $T_{11}$, the microcomputer 13 operates to deenergize the motor 3. The deenergization of the motor 3 is continued for a predetermined period of time till time $T_{12}$. The microcomputer 13 then inputs the transparency signal $S_{20}$ from the transparency detector 20 and the input signal is stored as the detection data $A_5$ in RAM. The light-emitting diode 19 is flashed in the time interval between $T_{11}$ and $T_{12}$.

FIG. 14 illustrates another neural network 49 for the detection of the degree of cleaning. Although the neural network 49 is actually composed in software configuration, it is shown in the embodiment as composed in hardware configuration for the purpose of description as in the neural network 45. The neural network 49 comprises an input layer I including three units $I_8$ to $I_{10}$, an intermediate layer J including two units $J_6$ to $J_7$, and an output layer K including one unit $K_3$. The principle of the neurocontrol in the neural network 49 is the same as that in the neural network 45.

Detection data $A_2$, $A_3$ and $A_4$ are input to the respective units $I_8$–$I_{10}$ of the input layer I. The neural network 49 calculates estimate data $A_5'$ of an optimum transparency of the wash liquid as an optimum degree of cleaning at time $T_{12}$, that is, at the time of completion of the wash step, as shown in FIG. 13. Accordingly, when the actual detection data $A_5$ at time $T_{12}$ is shown by a dashed line in FIG. 13, the curved line approximates a horizontal line, which indicates that further washing effect cannot be expected and only the damage of the cloth is quickened, resulting in overwashing. The dashed line shows that soil is being removed and the clothes are dirtier than estimated, resulting in insufficiency of washing. The actual detection data $A_5$ is compared with the estimation data so that the weighting factor W and the threshold value $\theta$ are compensated for in a manner described below. In the case of overwashing, the wash water stream and the wash period are reduced in accordance with the degree of overwashing. In the case of insufficiency of washing, the wash water stream and the wash period are increased in accordance with the degree of insufficiency.

The determination circuit 46 and the setting circuit 47 shown in FIG. 1 are composed as hardware by the neural network 49. For example, suppose the case where the output of the neural network 49 is $O_1=7$ and $O_2=7$ with respect to one input pattern. When this output mode results in overwashing, a compensation value $\Delta W$ ($\Delta W_{JI}$, $\Delta W_{KJ}$) of the weighting factor W and a compensation value $\Delta \theta$ ($\Delta \theta_{JI}$, $\Delta \theta_{KJ}$) of the threshold value $\theta$ are calculated by the compensation circuit 48 with the estimated output, $O_1=6$ and $O_2=6$, with respect to the input pattern as the training pattern (training data). The calculated compensation values are added to the respective initial values $W_0$ and $\theta_0$ of the weighting factor W and the threshold value $\theta$. When the above-described compensation is repeated, the compensation value $\Delta W$ is accumulated as $\Sigma \Delta W$ and the weighting factor W is expressed as follows:

$$W = W_0 + \Sigma \Delta W \qquad (16)$$

and the compensation value $\Delta \theta$ is accumulated as $\Sigma \Delta \theta$ and the threshold value $\theta$ is expressed as follows:

$$\theta = \theta_0 + \Sigma \Delta \theta. \qquad (17)$$

In this case, upper and lower limits of each of the compensated weighting factor W and the threshold value $\theta$ are set in RAM of the microcomputer 13 so that the compensated values are not deviated far from the respective initial values $W_0$ and $\theta_0$.

Referring to FIG. 5, the microcomputer 13 has a read-only memory (ROM) storing data of the initial values $W_0$ and $\theta_0$ of the weighting factor W and the threshold value $\theta$. RAM stores data of the input U of the unit, the output V of the unit, the weighting factor W, threshold value $\theta$, compensation values $\Delta W$ and $\Delta \theta$, and accumulations $\Sigma \Delta W$ and $\Sigma \Delta \theta$. Initial values of the accumulations $\Sigma \Delta W$, $\Sigma \Delta \theta$ are zero. A back-up power supply is provided for RAM or alternatively, non-volatile storage means such as an electrically programmable read-only memory (EPROM) is employed instead of RAM so that the stored contents are preserved even in the occurrence of a power failure.

Figure 21:
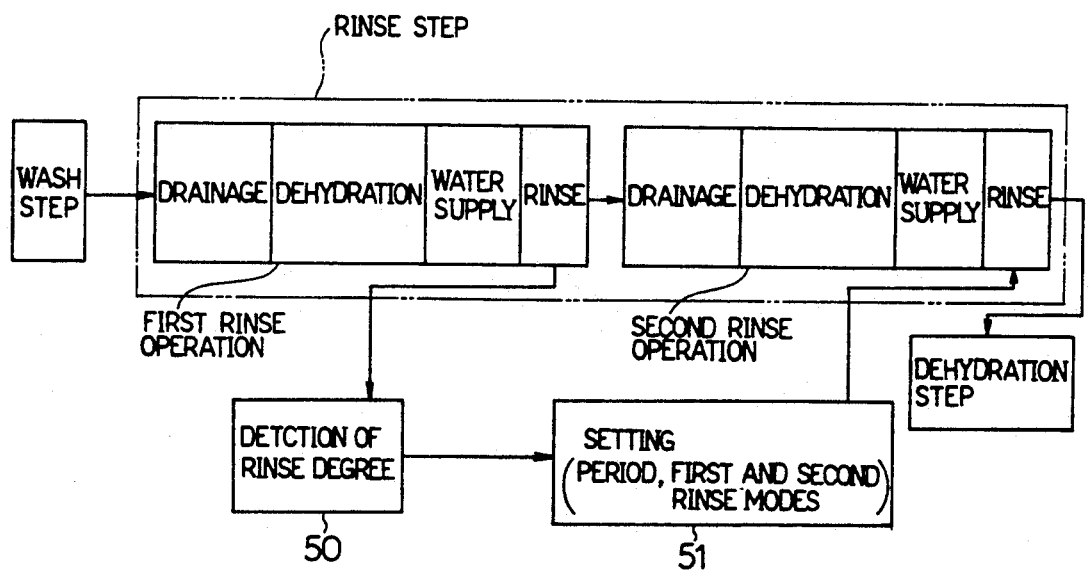
FIG. 21 is a flow diagram of a rinse step.

Upon completion of the above-described wash step at time $T_{12}$, the microcomputer 13 advances to a rinse step shown in FIG. 21. The rinse step includes sequential first and second rinse operations. The first rinse operation includes operations of "DRAINAGE" in which the electromagnet 35 is energized via the drive circuit 34 so that the drain valve 5 is opened, "DEHYDRATION" in which the motor 3 is energized to rotate the inner tub 7 with the valve 5 opened, "WATER SUPPLY" in which the water supply valve 11 is opened, and "RINSE" in which rinsing is performed in the same manner as in the agitation described above in the wash step. The second rinse operation includes operations of "DRAINAGE," "DEHYDRATION," "WATER SUPPLY" and "RINSE" which are the same as those in the first rinse operation, respectively. In this case the water level set in the wash step is reached in the "WATER SUPPLY" operation and the "RINSE" operation is performed under the wash water stream mode set in the wash step. A period of time of the second rinse operation will be determined as described later. Furthermore, two operation modes are provided for RINSE of the second rinse operation: a first operation mode in which water is resupplied during execution of RINSE and a second operation mode in which water is not resupplied during execution of RINSE. Which mode should be taken will be determined as described later.

Figure 22:
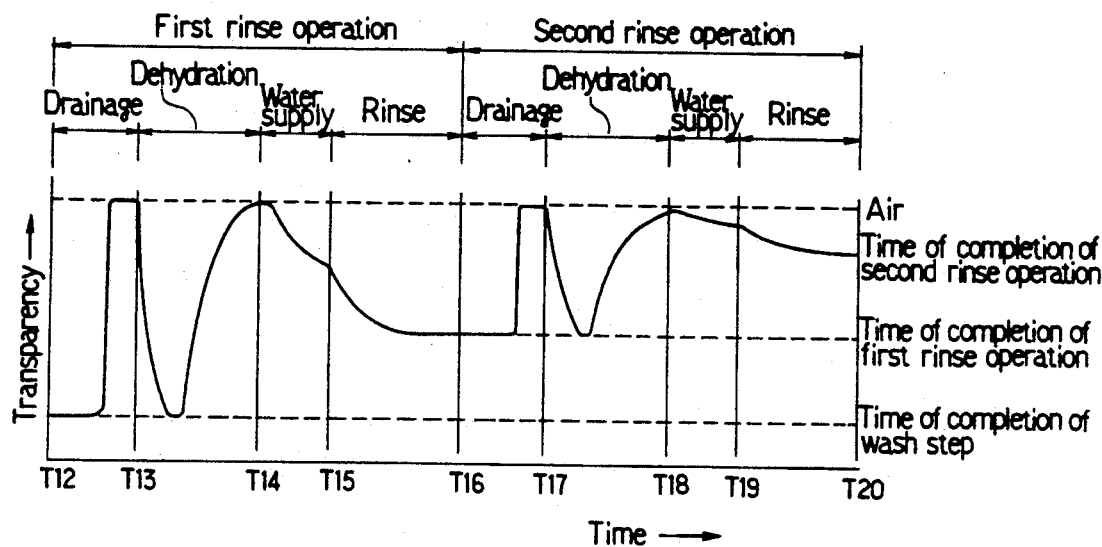
FIG. 22 is a graph showing the characteristic of the transparency.

FIG. 22 shows a change of transparency of the rinse liquid detected by the transparency detector 20 in the rinse step. Upon completion of the wash step at time $T_{12}$, the drainage operation of the first rinse operation is initiated. The transparency is maintained at the same value as that at the time of completion of the wash step while the wash liquid remains in the outer tub 2. Since substantially all the wash liquid is discharged when DRAINAGE is completed at time $T_{13}$, the transparency detector 20 detects aerial transparency. Subsequently, the wash liquid contained in the clothes is shaken off upon initiation of the dehydration and collected on the bottom of the outer tub 2. Consequently, the transparency detector 20 detects the transparency which is in the same level as that at the time of completion of the wash step. Subsequently, upon completion of DEHYDRATION at time $T_{14}$, substantially all the wash liquid is discharged out of the outer tub 2. The transparency detector 20 detects the aerial transparency again. Upon initiation of WATER SUPPLY, the wash liquid contained in the clothes oozes out into the supplied rinse liquid. Consequently, the transparency detected by the transparency detector 20 is lowered gradually. Subsequently, when RINSE is initiated at time $T_{15}$, the wash liquid contained in the clothes is transferred into the rinse liquid. The transparency of the rinse liquid detected by the transparency detector 20 is lowered to a large extent when the rinse is completed at time $T_{16}$.

Figure 23:
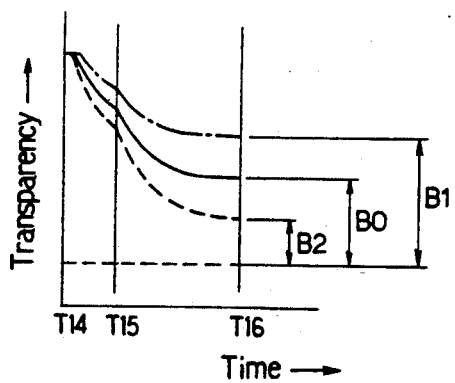
FIG. 23 is a graph for explaining the operation of detecting the degree of rinsing.

The first rinse operation is thus completed at time $T_{16}$. It is considered that the transparency detected by the transparency detector 20 at time $T_{16}$ differs depending upon the degree of rinsing, as shown in FIG. 23. The microcomputer 13 inputs the transparency detected by the transparency detector 20 at the time of completion of the first rinse operation and determines whether or not the detected transparency is above a reference transparency $B_0$. For example, when the detected transparency is at level $B_1$ above the reference transparency $B_0$, a period of RINSE of the second rinse operation is set accordingly and RINSE is set so as to be performed in the second rinse mode. Furthermore, when the detected transparency is at a level $B_2$ below the reference transparency, the period of the rinsing operation in the second rinse operation is accordingly rendered longer than that described above and RINSE in the second rinse operation is set so as to be performed in the first rinse mode. Subsequently, the microcomputer 13 operates to execute the second rinse operation and particularly, RINSE is performed either in the first or second rinse mode for the set period of time. The rinse step is thus completed at time $T_{20}$. In FIG. 21, functions of the microcomputer 13 are shown in the form of blocks like a detection circuit 50 and a setting circuit 51 for the sake of description.

Figure 24:
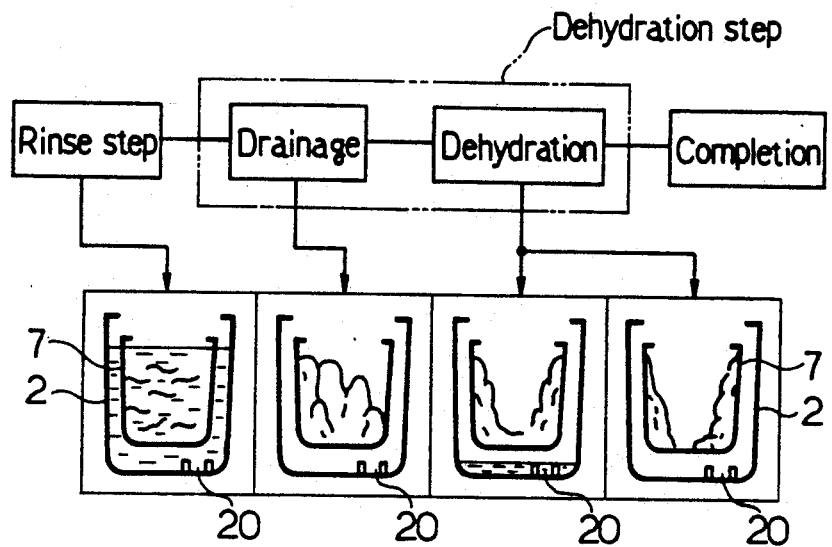
FIG. 24 is a flow diagram of a dehydration step.

Upon completion of the rinse step, the microcomputer 13 advances to a dehydration step as shown in FIG. 24. In the dehydration step, the drainage and dehydration are executed in the same manner as in the rinse step.

Figure 25:
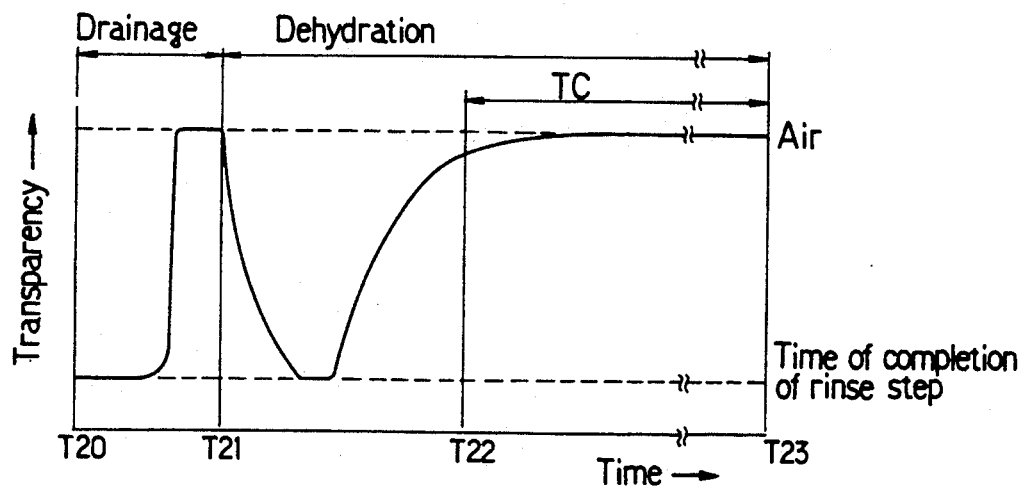
FIG. 25 is a graph showing the characteristic of the transparency.

FIG. 25 shows a change of transparency of the dehydration liquid detected by the transparency detector 20 in the dehydration step. Upon completion of the rinse step at time $T_{20}$, the drainage operation is initiated. The transparency is maintained at the same value as that at the time of completion of the rinse step while the rinse liquid remains in the outer tub 2. Since substantially all the rinse liquid is discharged when the drainage is completed at time $T_{21}$, the transparency detector 20 detects aerial transparency. Subsequently, the rinse liquid contained in the clothes is shaken off upon initiation of the dehydration and collected on the bottom of the outer tub 2. Consequently, the transparency detector 20 detects the transparency which is at the same level as that at the time of completion of the rinse step.

Subsequently, the rinse liquid shaken off from the clothes is discharged with progress of the dehydration. Accordingly, the transparency detected by the transparency detector 20 is raised toward the aerial transparency. When the difference $\Delta V_3$ between the detected transparency and the aerial transparency is reached at time $T_{22}$, the microcomputer 13 operates to complete the dehydration step at time $T_{23}$ which time is a predetermined period $t_c$ after time $T_{22}$.

Figure 26:
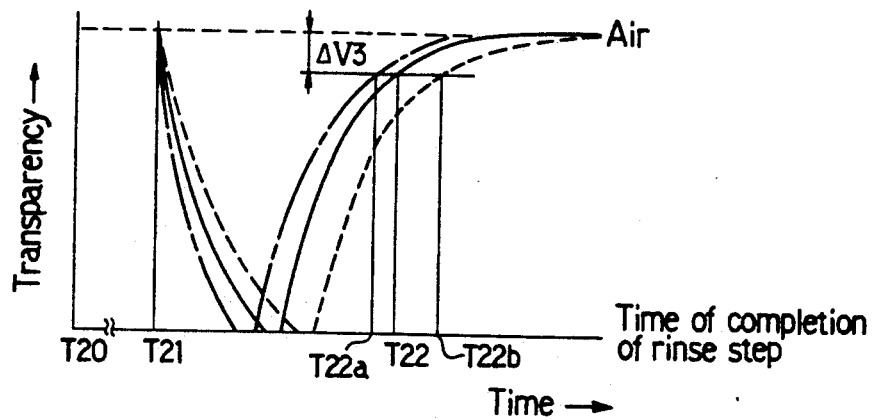
FIG. 26 is a graph for explaining the operation of detecting the degree of dehydration.

As shown in FIG. 26, when a standard amount of rinse liquid is contained in the clothes, the difference $\Delta V_3$ is reached at time $T_{22}$ as shown by the solid line. When the amount of rinse liquid contained in the clothes is smaller, the difference $\Delta V_3$ is reached at time $T_{22a}$ which time is earlier than $T_{22}$, as shown by the dashed line. When the amount of rinse liquid contained in the clothes is larger, the difference $\Delta V_3$ is reached at time $T_{22b}$ which time is later than $T_{22}$, as shown by the two-dot chain line. Thus, the period of the dehydration step is determined in accordance with the amount of rinse liquid contained in the clothes.

The following effects can be achieved in the above-described embodiment. The neural network 45 of the microcomputer 45 is supplied as the input data with the cloth volume data $D_1$ and the cloth type data $D_2$ as the cloth conditions representative of the state of the clothes to be washed and the like, the soil degree data $D_3$ and the soil type data $D_4$ as the soil conditions, the detergent volume data $D_5$ and the detergent type data $D_6$ as the detergent conditions, and the water temperature data $D_7$. The wash water stream and the wash period of the wash step are determined by way of the neurocontrol. Consequently, an optimum washing effect can be obtained in accordance with various washing conditions. Damage of the cloth due to overwashing can be prevented and the insufficiency in washing can also be prevented, which can prevent troublesome rewashing and the like.

The level of cleanliness of the clothes is detected by the transparency detector 20 at the time of completion of the wash step. When an optimum level of cleanliness is not obtained, the microcomputer 13 operates to set the training data so that the weighting factor and the threshold value are compensated for. Consequently, learning of the neural network can be performed during use of the washing machine and accordingly, further optimum washing effect can be achieved.

Since the upper and lower limits are set for each of the compensated weighting factor and the threshold value, the weighting factor and the threshold value can be prevented from being excessively deviated from the respective initial values as the result of unsuitable compensation. Consequently, the washing operation of the washing machine can be prevented from being unexecuted.

The transparency detector 20 serves to detect the soil degree and the soil type as the soil conditions, the detergent volume and the detergent type as the detergent conditions, and the level of cleanliness of the clothes at the time of completion of the wash step. Thus, the number of sensors or detectors can be reduced, resulting in reduction of the production cost of the washing machine.

The data of the compensated weighting factor and the threshold value of the neural network 45 is stored in RAM with back-up power supply or the non-volatile memory means such as EPROM. Consequently, the contents of compensation can be preserved even in occurrence of power supply failure.

The cleanliness level of the clothes is determined by the neural network 49 to which the values of the transparency detected by the transparency detector 20 at a plurality of times during the wash step are supplied as the input data. Consequently, the determination of the cleanliness level can be reliably performed.

The light-emitting diode 19 indicative of activation of the neural network is flashed in the periods T4-T5, T7-T8, T9-T10 and T11-T12. This is advantageous in that the interruption of the washing operation does not cause the user to consider that some failure has happened in the washing machine.

In the rinse step, the degree of rinsing is detected based on the output of the transparency detector 20 so that the period of RINSE in the second rinse operation is set and which of the first and second rinse modes should be set is determined. Consequently, an optimum rinse effect can be achieved.

In the dehydration step, the amount of rinse liquid contained in the clothes is determined based on the output of the transparency detector 20 so that the period of the dehydration step is varied. Consequently, an optimum dehydration effect can be achieved.

Figure 27:
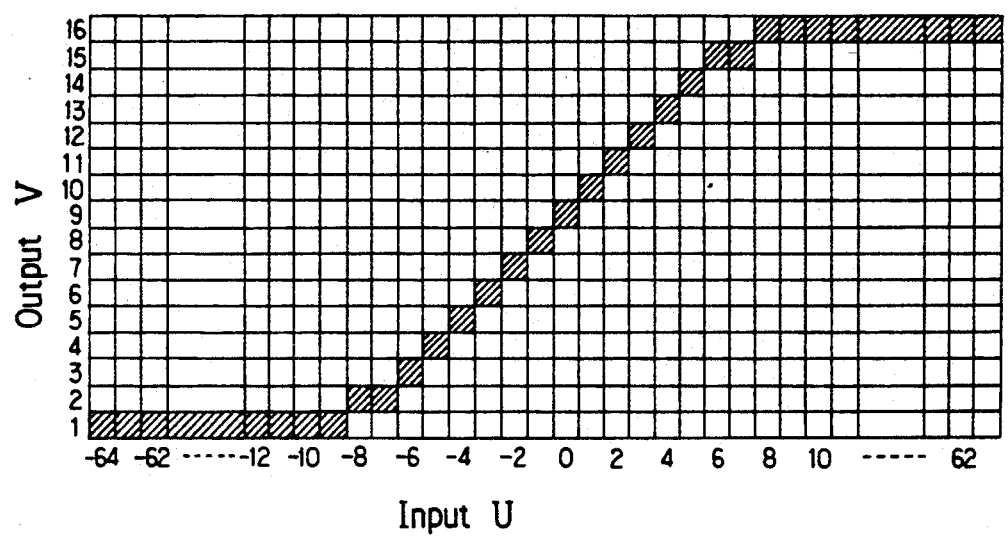
FIG. 27 is a graph showing an example of the matrix representative of the sigmoid function in another embodiment of the invention.

Although the value of the sigmoid function F is obtained by calculation in the foregoing embodiment, the result of calculation may be obtained by way of a matrix as shown in FIG. 27 as a second embodiment of the invention. More specifically, FIG. 27 illustrates one example of a matrix representative of the sigmoid function F. The axis of ordinates indicates the output V and the axis of abscissas the input U. For example, the output V becomes 9 (V=9) when the input U is 0 (U=0).

Figure 28:
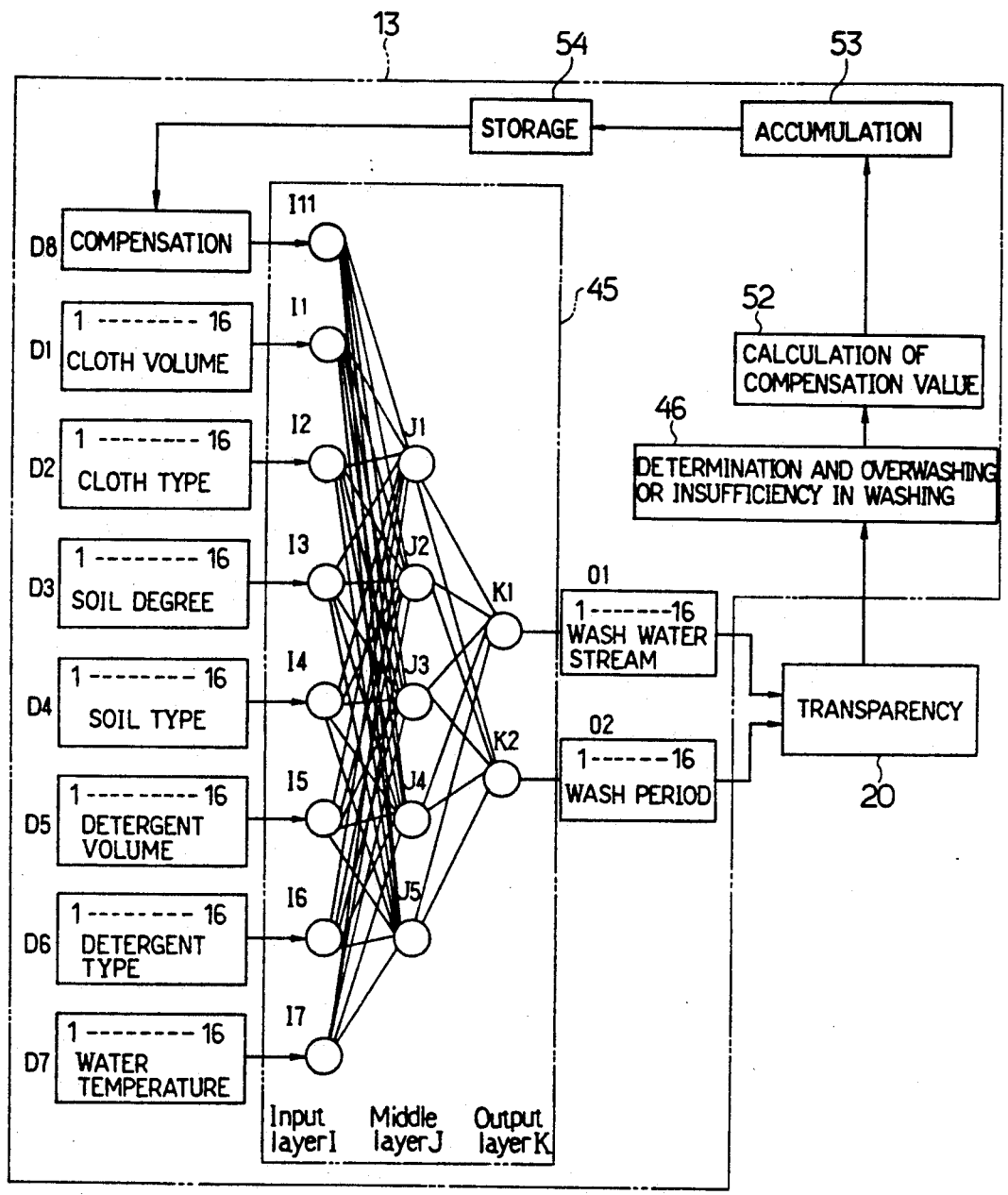
FIG. 28 is a view similar to FIG. 1 showing further another embodiment of the invention.

FIG. 28 illustrates a third embodiment of the invention. Like reference numerals designate like or similar parts in FIGS. 1 and 28. The difference between the first and third embodiments will be described.

The input layer I of the neural network 45 has another unit $I_{11}$ in addition to those described in the first embodiment. The unit $I_{11}$ is connected to the units $J_1$–$J_5$ of the middle layer J by the links. Furthermore, the microcomputer 13 is provided with the determination circuit 46, a compensation value calculation circuit 52, an accumulation circuit 53 and a storage circuit 54. In FIG. 28, each of the determination circuit 46, the compensation value calculation circuit 52 and the accumulation circuit 53 is shown in a functional block for the sake of description though each of them is actually arranged in software for the microcomputer 13.

The determination circuit 46 is supplied with the transparency or cleanliness level signal generated by the transparency detector 20 at the time of completion of the wash step. Based on the supplied detection signal, the determination circuit 46 determines whether the washing operation is sufficient or not and detects the degree of overwashing or insufficiency. The detected degree of overwashing or insufficiency detected by the determination circuit 46 is supplied to the compensation value calculation circuit 52, which calculates the compensation value based on the detected degree. The result of calculation is supplied to the accumulation circuit 53. The compensation value from the compensation value calculation circuit 52 is accumulated in the accumulation circuit 53 having the initial value of 0. The result of accumulation by the accumulation circuit 53 is stored in the storage circuit 54 and is supplied as compensation data $D_8$ to the unit $I_{11}$.

In the third embodiment, the weighting factor and the threshold of the neural network 45 are not compensated for and the compensation data $D_8$ is added with some weighting factor and threshold value. Consequently, the same effect can be achieved in the third embodiment as in the first embodiment and furthermore, it is advantageous that the weighting factor and the threshold value of the neural network 45 need not be varied.

Although both of the weighting factor and the threshold value of the neural network are compensated for in the first embodiment, either one of them may be compensated for.

In the foregoing embodiments, the neural network 45 is supplied with the cloth volume data $D_1$ and the cloth type data $D_2$ as the cloth conditions representative of the state of the clothes to be washed and the like, the soil degree data $D_3$ and the soil type data $D_4$ as the soil conditions, the detergent volume data $D_5$ and the detergent type data $D_6$ as the detergent conditions, and the water temperature data $D_7$. However, other conditions may be supplied as the input data to the neural network 45. A sufficient effect can be achieved in the neurocontrol when the neural network 45 is supplied with at least the cloth volume data $D_1$ and the cloth type data $D_2$ as the cloth conditions, soil degree data $D_3$ and the soil type data $D_4$ as the soil conditions.

Although the neurocontrol is performed in the STANDARD course in the foregoing embodiments, it may be performed in other washing courses in the same manner.

The foregoing disclosure and drawings are merely illustrative of the principles of the present invention and are not to be interpreted in a limiting sense. The only limitation is to be determined from the scope of the appended claims.

We claim:
1. A washing machine comprising:
   a) a sensor means for sensing states of clothes to be washed or the like, the states of clothing including a cloth condition including a cloth volume and a soil condition including a soil degree; and
   b) control means including a neural network to which data from the sensor means is input so that a wash period of a wash step of the washing operation is determined under a neurocontrol and the wash step is executed, the control means being provided with a function of causing the neural network to execute relearning so that contents of the wash step to be executed are compensated for in accordance with a degree of cleaning of the clothes at the time of completion of the wash step.

2. A washing machine according to claim 1, wherein the input data from the sensor means includes data of a cloth condition including a cloth volume and a cloth type and a soil condition including a soil degree and a soil type and contents of the wash step to be executed under control of the control means include a wash water stream mode and a wash period.

3. A washing machine according to claim 1, which further comprises a transparency detector for detecting the transparency of a wash liquid and wherein the control means compensates for either one or both of a weighting factor and a threshold value of the neurocontrol by means of training data which is based on the transparency detected by the transparency detector at the time of completion of the wash step, thereby compensating for the contents of the wash step to be executed.

4. A washing machine according to claim 3, wherein when either one or both of the weighting factor and the threshold value of the neurocontrol are compensated for, either one or both of the weighting factor and the threshold value compensated for are provided with upper and lower limit values respectively.

5. A washing machine according to claim 3, wherein the transparency detector further serves as a detector for detecting a soil degree and a soil type in accordance with a variation pattern of the transparency of the wash liquid in the wash step, the soil degree and the soil type being included in the state of the clothes to be washed or the like.

6. A washing machine according to claim 3, wherein the control means determines the degree of cleaning by means of the neurocontrol having input data including levels of the transparency detected by the transparency detector at a plurality of times during the wash step.

7. A washing machine according to claim 1, which transparency of a wash liquid and wherein the control means supplies the neurocontrol with compensation data based on the transparency of the wash liquid detected by the transparency detector at the time of completion of the wash step, thereby compensating for the contents of the wash step to be executed.

8. A washing machine according to claim 7, wherein the transparency detector further serves as a detector for detecting a soil degree and a soil type in accordance with a variation pattern of the transparency of the wash liquid in the wash step, the soil degree and the soil type being included in the state of the clothes to be washed or the like.

9. A washing machine according to claim 7, wherein the control means determines the degree of cleaning by means of the neurocontrol having input data including levels of the transparency detected by the transparency detector at a plurality of times during the wash step.

10. A washing machine according to claim 1, wherein compensated contents of the wash step compensated for by the control means are stored in either non-volatile storage means or storage means with a backup power supply.

* * * * *